United States Patent [19]

Ishizaka

[11] 4,085,416
[45] Apr. 18, 1978

[54] APERTURE INTERLOCKING DEVICE FOR A SINGLE LENS REFLEX CAMERA OF THE INTERCHANGEABLE VIEWFINDER TYPE

[75] Inventor: Sunao Ishizaka, Tokyo, Japan

[73] Assignee: Nippon Kogaku K.K., Tokyo, Japan

[21] Appl. No.: 749,047

[22] Filed: Dec. 9, 1976

[30] Foreign Application Priority Data

Dec. 9, 1975 Japan .................................. 50-150586

[51] Int. Cl.$^2$ .............................................. G03B 13/02
[52] U.S. Cl. ...................................... 354/219; 354/152
[58] Field of Search ................ 354/219, 46, 152, 155, 354/225, 224

[56] References Cited

U.S. PATENT DOCUMENTS 3,940,779  2/1976  Kuronoto et al. ............... 354/219 X Primary Examiner—Edna M. O'Connor Attorney, Agent, or Firm—Fitzpatrick, Cella, Harper & Scinto

[57] ABSTRACT

In a single lens reflex camera, an aperture interlocking device wherein a pantograph mechanism has one lever biased in one direction within a viewfinder detachable with respect to the body of the camera, is connected to the engaging portion of the aperture ring of the picture-taking lens during the mounting of the viewfinder to the camera body so that the aperture information of the picture-taking lens is transmitted to an exposure control device by displacement of the pantograph mechanism, is provided with first guide means for guiding the pantograph mechanism so that a pin on the one lever of the pantograph mechanism is rotatable about the optical axis of the picture-taking lens, an engaging lever engageable with the engaging portion of the aperture ring and supported for rotation on the one lever of the pantograph mechanism, and second guide means for guiding the engaging lever so that the engaging lever is rotated about the optical axis of the picture-taking lens.

6 Claims, 5 Drawing Figures

APERTURE INTERLOCKING DEVICE FOR A SINGLE LENS REFLEX CAMERA OF THE INTERCHANGEABLE VIEWFINDER TYPE

BACKGROUND OF THE INVENTION

1. Field of the Invention

This invention relates to an aperture interlocking device for the picture-taking lens and the viewfinder of a single lens reflex camera of the type which permits interchange of the viewfinder.

2. Description of the Prior Art

In a single lens reflex camera of the type which permits interchange of the viewfinder, an interlocking member engageable and interlocked with a pawl or a projection of the aperture ring of the picture-taking lens (hereinafter referred to as the engaging portion of the aperture ring) is provided in the viewfinder so that the lens aperture information may be transmitted to the exposure control device in the viewfinder by the displacement of the interlocking member corresponding to the movement of the aperture ring.

A pantograph mechanism has been used as an example of such interlocking member. When such pantograph mechanism is used, the axis of rotation of the portion of the mechanism engaged with the engaging portion of the aperture ring is not coincident with the axis of rotation of said engaging portion and this varies the position of contact of the engaging portion on the pantograph mechanism. For this reason, the engaging portion of the pantograph mechanism has unavoidably been formed as a round pin.

Such a round pin has increased the radial space thereof and accordingly led to increased design limitations.

SUMMARY OF THE INVENTION

I have conceived and contribute, by the present invention, an aperture interlocking mechanism whereby the position of contact of the engaging portion of the mechanism is not variable by rotation of the aperture ring of the picture-taking lens.

According to one aspect of the present invention, I am able to prevent the engaging portion of the pantograph mechanism from being located at the uninterlockable side with respect to the engaging portion of the aperture ring upon mounting of the viewfinder onto the camera, irrespective of any aperture value to which the picture-taking lens is set.

By a further aspect of the present invention, I permit mounting of even a lens of the type which will interfere with the pantograph mechanism to render itself unmountable.

Thus, the aperture interlocking device of the present invention in a single lens reflex camera wherein a pantograph mechanism biased in one direction within viewfinder detachable with respect to the body of the camera is connected to the engaging portion of the aperture ring of the picture-taking lens during the mounting of the viewfinder to the camera body so that the aperture information of the picture-taking lens is transmitted to an exposure control device by displacement of the pantograph mechanism, is provided with first guide means for guiding the pantograph mechanism so that a pin on one lever of the pantograph mechanism is rotatable about the optical axis of the picture-taking lens, an engaging member engageable with the engaging portion of the aperture ring and supported for rotation on said one lever of the pantograph mechanism, and second guide means for guiding the engaging member so that the engaging member is rotated about the optical axis of the picture-taking lens.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein:

FIGS. 1 to 5 illustrate an embodiment of present invention in which FIG. 1 shows the open aperture condition in the aperture interlocking position;

FIG. 2 shows the minimum aperture condition in the aperture interlocking position;

FIG. 3 shows a position in which the viewfinder is mounted under any other condition than the open aperture condition;

FIG. 4 shows a position similar to FIG. 3 but in which the parts are in the open aperture condition; and FIG. 5 shows a position in which engagement between the pantagraph mechanism and the aperture ring has been rendered impossible.

DESCRIPTION OF THE PREFERRED EMBODIMENTS

Figure 1:
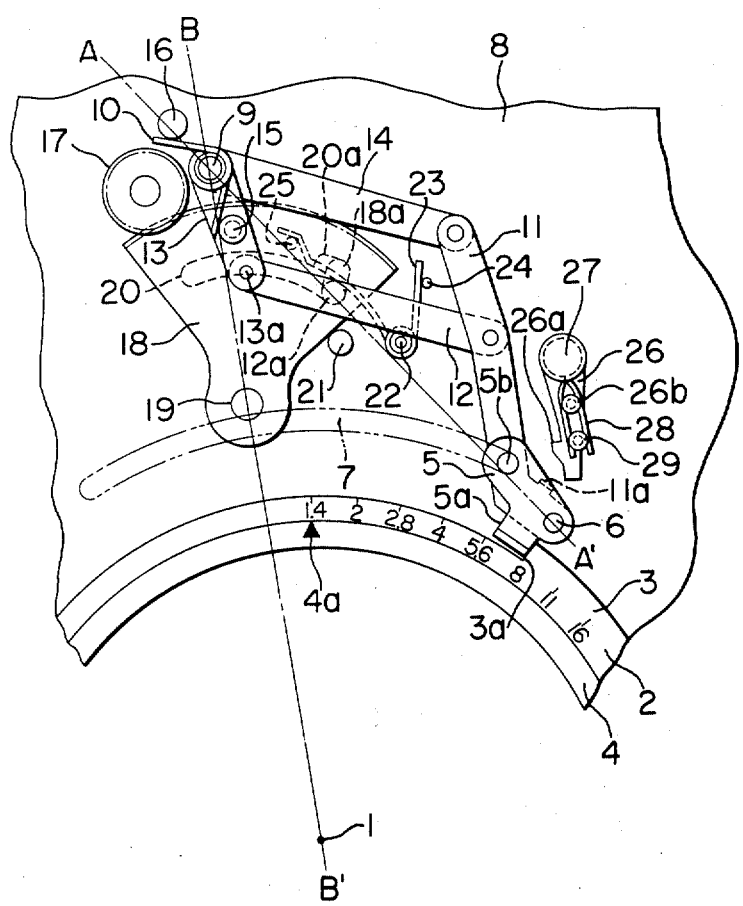
Figure 2:
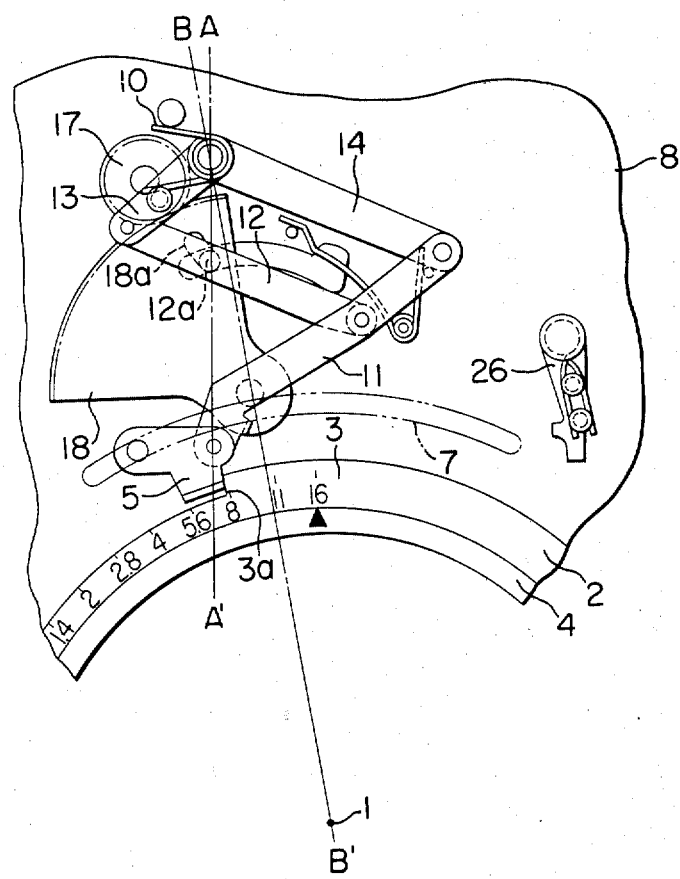
Figure 3:
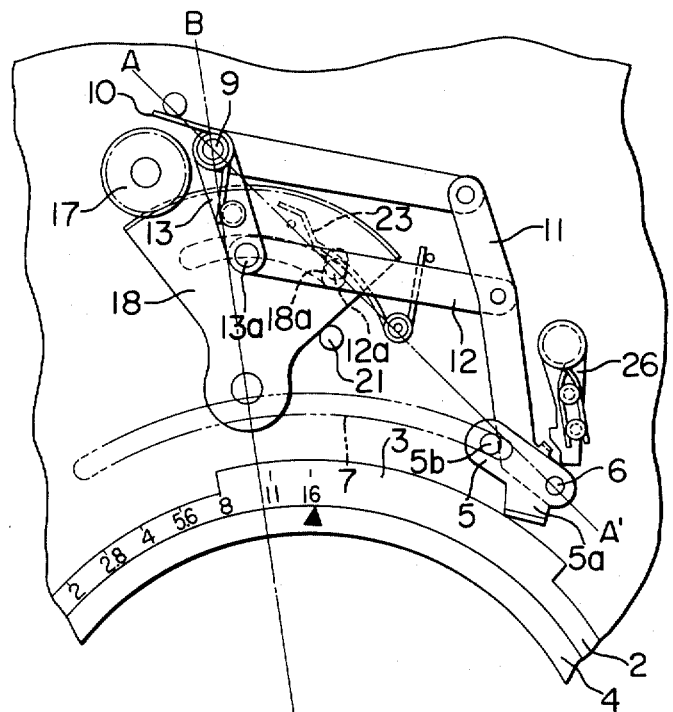

An embodiment of the present invention will hereinafter be described. FIGS. 1 and 2 show the aperture interlocking position, and FIG. 3 shows the aperture non-interlocking position. In FIG. 1 wherein the aperture is in open condition, an aperture ring 2 rotatable about the optical axis 1 of the picture-taking lens has an outwardly projected and circumferentially extending engaging portion 3 provided over a wider range than the entire range of the aperture scale and defining a shoulder 3a. A lens barrel 4, which is the fixing system for the picture-taking lens, is provided with an aperture index mark 4a.

An engaging lever 5 having a projection 5a engageable with the shoulder 3a of engaging portion 3 of the aperture ring 2 has one end thereof rotatably mounted on one end of a first pantalever of a pantograph mechanism, to be described, by means of a connecting shaft 6 circularly movable about the optical axis 1 of the picture-taking lens, and has the other end provided with a guide pin 5b engaged in an arcuate guide groove 7 centered at the optical axis 1 of the lens and formed in a front base plate (not shown) which is the fixing system for the viewfinder. Studded in a rear base plate 8, which also is the fixing system for the viewfinder, is a pantoshaft 9, and the pantograph mechanism is normally biased by a bias spring 10 for counter-clockwise rotation about the pantoshaft 9. The pantograph mechanism comprises a first panto-lever 11 having an extension extending beyond the parallelogram and forming a bent portion 11a at the end of the extension, a second panto-lever 12 having an interlocking pin 12a lying on a straight line A-A' passing through the connecting shaft 6 and the panto-shaft 9, a third panto-lever 13 having a pin 15 for securing thereto the aforementioned bias spring 10, and a fourth panto-lever 4. Designated by 16 is a pin on the rear base plate 8 with which the bias spring is engaged.

A connecting gear 17 is connected to the calculating mechanism (not shown) of a well-known exposure control device in the viewfinder, and a segment gear 18 is in meshing engagement with the connecting gear 17. The segment gear 18 has a vertically elongated slot 18a formed substantially radially thereof and engageably receiving the interlocking pin 12a, and is rotatable about a gear shaft 19 studded in the rear base plate 8 and lying on a straight line B—B' passing through the optical axis 1 of the lens and the panto-shaft 9.

On the rear base plate 8, there is provided an arcuate groove 20 centered at the gear shaft 19 and having an enlarged portion 20a extending circumferentially in the leftmost end portion thereof, so that the slot 18a and the enlarged portion 20 may overlap each other when the segment gear 18 is brought to its rightmost position by the bias spring 10.

A stop 21 is provided to serve as a limit for preventing the pantograph mechanism and the segment gear 18 from moving further rightwardly beyond their positions illustrated in FIG. 1 once interlocking is established with the aperture open.

A restriction spring 23 supported by a spring shaft 22 studded in the rear base plate 8 is engageable with the interlocking pin 12a extending through the enlarged portion 20a of the arcuate groove and may produce a downward(counter-clockwise) bias force with upward movement of the pin 12a. Designated by 24 and 25 are pins studded in the rear base plate 8 and the restriction spring 23 is engaged with these pins.

A restraining lever 26 has an engaging pawl 26a, engageable with the bent portion 11a of the first panto-lever, and a spring-engaging pin 26b, and is rotatable about a shaft 27 studded in the rear base plate 8 and in a plane in which the lever 26 is engageable with the bent portion 11a. The restraining lever 26 is also extraneously operable by means of an operating member, not shown.

A restraining lever spring 28 supported by the shaft 27 holds between the opposite ends thereof the pin 26b and a fixed pin 29 studded in the front base plate, thereby restricting the restraining lever 26 to its shown position.

Operation will now be described. When the aperture ring 2 is rotated counter-clockwise from the open aperture condition of FIG. 1 to provide for a predetermined aperture, the engaging lever 5 is forced by the shoulder 3a of the engaging portion 3 to move leftwardly with the aid of the guide groove 7 in the front base plate.

That is, the engaging lever 5 is pivotally moved about the optical axis 1 of the lens while keeping its engagement with the engaging portion 3.

By the movement of the engaging lever 5, the pantograph mechanism is rotated as a whole counter-clockwise against the bias force of the bias spring 10 and because of the engagement between the interlocking pins 12a and the slot 18a, the segment gear 18 is also rotated leftwardly counter-clockwise, as viewed in the drawing. Thus, the connecting gear 17 is rotated clockwise to actuate the calculating mechanism of the exposure control device in order to transmit the lens aperture information. During the movement of the pantograph mechanism, the arcuate groove 20 holds the interlocking pin 12a against vertical movement within the slot 18a. FIG. 2 shows the position in which the aperture ring 2 has been rotated to set the picture-taking lens to a minimum aperture.

Description will now be made of the case in which the viewfinder of the present invention is mounted with the aperture of the picture-taking lens being in any other condition than the open condition.

Before the viewfinder is mounted to the camera body, namely: when the viewfinder is separate from the camera body, the pantograph mechanism and the segment gear 18 are biased rightwardly by the bias spring 10 so that the segment gear 18 is in engagement with the stop 21.

In FIG. 3, the viewfinder is mounted in the direction from top to bottom. During the mounting, when the projection 5a of the engaging lever 5 is engaged with the engaging portion 3 and subjected to an upward reaction, the lever 5 is slightly leftwardly moved along the guide groove 7 while it is pivoted counter-clockwise substantially about the guide pin 5b, thus raising the first panto-lever 11 upwardly. Accordingly, the second panto-lever 12 is rotated counter-clockwise substantially about the connecting shaft 13a connecting the second panto-lever to the third panto-lever 13, and the fourth panto-lever 14 is rotated counter-clockwise about the panto-shaft 9. At the same time, the interlocking pin 12a moves upwardly within the slot 18a and the enlarged portion 20a of the arcuate groove 20 against the bias force of the restriction spring 23 until it occupies a generally middle position in the slot 18a.

Figure 4:
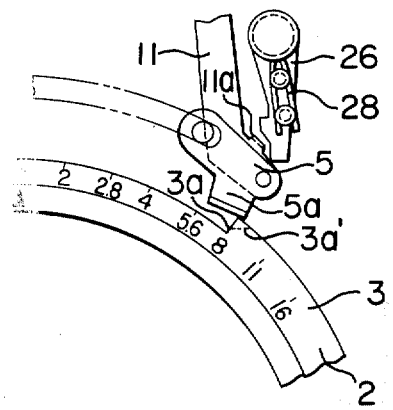

Subsequently, the aperture ring 2 is rotated clockwise to provide for an open aperture. The projection 5a comes toward the shoulder 3a of the engaging portion 3 but still remains out of engagement therewith, as shown in FIG. 4. Therefore, the restraining lever 26 is rotated clockwise by means of an unshown operating member, whereby the end portion of the restraining lever 26 is brought into engagement with the bent portion 11a to move the first panto-lever 11 leftwardly, thereby bringing the projection 5a out of engagement with the left corner of the engaging portion 3.

When the operating member is released from operation, the restraining lever 26 is returned to its original position by the bias force of the restraining lever spring 28 and the first panto-lever 11 is also biased rightwardly by the bias spring 10, so that the projection 5a is brought into engagement with the shoulder 3a of the engaging portion 3, as shown in FIG. 1. Thereafter, the engagement as shown in FIGS. 1 and 2 will never be lost even if the aperture ring 2 is set to any aperture value.

When a lens engageable with the engaging lever 5, but not having the function of interlocking with the exposure control device in the viewfinder, is to be mounted to the camera, or when the viewfinder of the present invention is to be mounted with the camera having such lens mounted thereon, the mounting should be effected with the engaging lever 5 manually raised upwardly.

Figure 5:
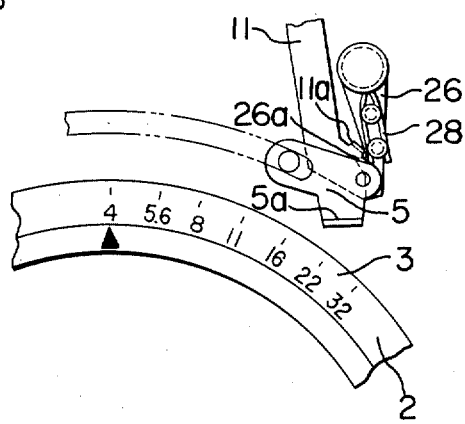

When the engaging lever 5 is so raised upwardly, the first panto-lever 11 is also raised upwardly to bring the bent portion 11a into engagement with the end portion of the restraining lever 26 and thereby temporally rotate this lever 26 counter-clockwise, whereafter the lever 26 is rotated clockwise by the bias force of the restraining lever spring 28 to ring the bent portion 11a into engagement with the engaging pawl 26a. Thereafter, even if the engaging lever 5 is released, the pantograph mechanism will be maintained in the position of FIG. 5, so that no engagement will occur between the engaging lever 5 and the picture-taking lens.

Release may be accomplished by operating the operating member, not shown. The restraining lever 26 is rotated counter-clockwise to bring the bent portion 11a out of engagement with the engaging pawl 26a. Thus, the lever 26 is returned to its original position by the bias force of the spring 28.

If the corner position of the shoulder 3a of the projection 3 is formed into a ramp 3a' as indicated by dot-and-dash line in FIG. 4, and when the lens aperture is set to the open structure, then the projection 5a of the engaging member will be caused to slide on the ramp 3a' by the bias force of the restriction spring 23, thereby making intimate engagement with the shoulder 3a of the engaging portion.

Thus, the provision of such a ramp 3a' eliminates the need to move the pantograph mechanism by the use of the restraining lever 26. In other words, it becomes unnecessary to make the restraining lever 26 rotatable clockwise further from the position shown in FIG. 4.

According to the present invention, as has hitherto been described, the position of contact of the engaging portion of the viewfinder with the engaging portion of the aperture ring is invariable so that an allowance is provided for the radial space of the lens and this decreases the limitations in designing while increasing the smoothness and accuracy of the interlocking performance.

Also, even if the lens aperture ring is set to any other aperture value than the open aperture during the mounting of the viewfinder onto the camera, the engaging portion of the viewfinder will never become incapable of interlocking and this will eliminate the need to effect any cumbersome operation when mounting the viewfinder, which will in turn lead to a correspondingly simplified construction and reduced troubles or failures.

Further, even a lens of the type which would interfere with the pantograph mechanism to render itself unmountable may be mounted by a simple construction.

I believe that the construction and operation of my novel aperture interlocking device will now be understood and that the advantages thereof will be fully appreciated by those persons skilled in the art.

I CLAIM:

1. An aperture interlocking device for a single lens reflex camera wherein a pantograph mechanism has one lever biased in one direction within a viewfinder detachable with respect to the body of the camera is connected to an engaging portion of the aperture ring of the picture-taking lens during the mounting of the viewfinder to the camera body so that the aperture information of the picture-taking lens is transmitted to an exposure control device by displacement of the pantograph mechanism, the improvement comprising:
    first guide means (12a, 20) for guiding said pantograph mechanism (9, 10, 11, 12, 13, 14);
        a first pin (6) on one lever (11) of said pantograph mechanism and rotatable about the optical axis (1) of said picture-taking lens;
        an engaging member (5) engageable with the engaging portion (3) of said aperture ring (2) and supported for rotation one said one lever (11) of said pantograph mechanism; and
        second guide means (7, 5b) for guiding said engaging member (5) so that the engaging member is rotated about said optical axis of said picture-taking lens.

2. An aperture interlocking device according to claim 1, wherein a segment gear (18) is rotatably mounted on a stationary portion of the viewfinder device so that the axis of rotation thereof lies on a straight line (B–B') passing through said optical axis and the support shaft (9) of said pantograph mechanism, said segment gear being effective to transmit a signal corresponding to the angle of rotation thereof to said exposure control device, and said first guide means comprises a first arcuate guide groove (20) formed in said stationary portion and centered at the axis of rotaion of said segment gear, a second pin (12a) engageable in said first guide groove, and means securing said second pin to another lever (12) of said pantograph mechanism, said second pin being located on a straight line (A—A') passing through the pivot point (6) of said engaging member (5) with respect to said one lever (11) and the support shaft (9) of said pantograph mechanism.

3. An aperture interlocking device according to claim 2, wherein an escape portion (20a) for said second pin (12a) is formed in said first arcuate guide groove (20) so that said engaging member (5) is retractable from its position of engagement with the engaging portion (3) of said aperture ring (2) when said pantograph mechanism is in its original position due to the bias force thereof.

4. An aperture interlocking device according to claim 3, wherein an engaging slot (18a) engageable by said second pin (12a) is formed in said segment gear (18), whereby displacement of said pantograph may be transmitted to said segment gear by the engagement between said second pin and said engaging slot.

5. An aperture interlocking device according to claim 4, further comprising:
    means (26, 26a, 26b, 27, 28, 29, 11a) for restraining said pantograph mechanism in a position wherein said engaging member (5) has been retracted from the position of engagement with the engaging portion (3) of said aperture ring (2).

6. An aperture interlocking device according to claim 1, wherein said second guide means (7, 5b) comprises:
    a second arcuate guide groove (7) formed in the stationary portion of said viewfinder device and centered at the optical axis (1) of said picture-taking lens; and
    a third pin (5b) secured to said engaging member (5).

* * * * *

UNITED STATES PATENT AND TRADEMARK OFFICE
CERTIFICATE OF CORRECTION

PATENT NO. : 4,085,416
DATED : April 18, 1978
INVENTOR(S) : SUNAO ISHIZAKA

It is certified that error appears in the above-identified patent and that said Letters Patent are hereby corrected as shown below:

Column 3, line 43, change "266" to --26b--,

Column 5, line 3, change "ring" to --bring--;
line 18, change "structure" to --aperture--.

Column 6, line 10, change "one" first occurrence to -- on --.

Signed and Sealed this

Twenty-second Day of May 1979

[SEAL]

Attest:

RUTH C. MASON
Attesting Officer

DONALD W. BANNER
Commissioner of Patents and Trademarks